United States Patent
Lin (10) Patent No.: US 8,625,558 B2
(45) Date of Patent: Jan. 7, 2014

(54) METHOD AND APPARATUS TO DETERMINE A CFI (CONTROL FORMAT INDICATOR) VALUE IN A WIRELESS COMMUNICATION NETWORK

(75) Inventor: Ko-Chiang Lin, Taipei (TW)

(73) Assignee: Innovative Sonic Corporation, Taipei (TW)

(*) Notice: Subject to any disclaimer, the term of this patent is extended or adjusted under 35 U.S.C. 154(b) by 226 days.

(21) Appl. No.: 13/103,706

(22) Filed: May 9, 2011

(65) Prior Publication Data

US 2011/0273994 A1 Nov. 10, 2011

Related U.S. Application Data

(60) Provisional application No. 61/332,825, filed on May 10, 2010.

(51) Int. Cl.
*H04W 4/00* (2009.01)
*H04W 84/12* (2009.01)

(52) U.S. Cl.
CPC ................................ *H04W 84/12* (2013.01)
USPC .......................................... 370/338; 370/241

(58) Field of Classification Search
USPC .................... 370/310–350, 229–252
See application file for complete search history.

(56) References Cited

U.S. PATENT DOCUMENTS

2011/0243056 A1* 10/2011 Jen ................................ 370/312
2011/0274061 A1* 11/2011 Li ................................ 370/329

* cited by examiner

*Primary Examiner* — Kan Yuen
(74) *Attorney, Agent, or Firm* — Blue Capital Law Firm, P.C.

(57) ABSTRACT

A method and apparatus are disclosed determine a CFI value in a wireless communication system. In one embodiment, the method comprises configuring system devices, such as a UE or an eNB, with a plurality of component carriers for carrier aggregation. Furthermore, the method comprises receiving PDSCH on a first component carrier. The method also comprises transmitting a corresponding PDCCH on a second component carrier. In addition, the method comprises using a RRC signal to configure a CFI with an initial configured value. The method further comprises setting the CFI so that the CFI could be used to determine a starting point of the PDSCH.

12 Claims, 5 Drawing Sheets

600

Configuring system devices with a plurality of component carriers for carrier aggregation 602

↓

Receiving PDSCH on a component carrier 604

↓

Using a RRC signal to configure a CFI with an initial configured value 606

↓

Setting the CFI so that it could be used to determine a starting point of the PDSCH 608

METHOD AND APPARATUS TO DETERMINE A CFI (CONTROL FORMAT INDICATOR) VALUE IN A WIRELESS COMMUNICATION NETWORK

CROSS-REFERENCE TO RELATED APPLICATIONS

The present application for patent claims the benefit of U.S. Provisional Patent Application Ser. No. 61/332,825, filed on May 10, 2010, entitled "Method and Apparatus of Handling Dynamic Aperiodic SRS in a Wireless Communication System".

FIELD

This disclosure relates generally to a method and apparatus to determine a CF (Control Format Indicator) value in a wireless communication network.

BACKGROUND

Wireless communication systems are widely deployed to provide various types of communication content such as voice, data, and so on. These systems may be multiple-access systems capable of supporting communication with multiple users by sharing the available system resources (e.g., bandwidth and transmit power). Examples of such multiple-access systems include code division multiple access (CDMA) systems, time division multiple access (TDMA) systems, frequency division multiple access (FDMA) systems, 3GPP Long Term Evolution (LTE) systems, 3GPP LTE-A (Long Term Evolution Advanced) systems, and orthogonal frequency division multiple access (OFDMA) systems.

In these systems, signalling CFI for every subframe would require extra overhead. Furthermore, reconfiguration would occur often when Multi-Media Broadcast over a Single Frequency Network (MBSFN) subframe configuration changes. In addition, additional interaction or coordination among eNBs (Evolved Node B) would be required to maintain CFI information for each eNB.

Therefore, it would be beneficial to provide a method and apparatus to efficiently determine and handle the CFI.

SUMMARY

A method and apparatus are disclosed determine a CFI value in a wireless communication system. In one embodiment, the method comprises configuring system devices, such as a UE (User Equipment) or an eNB, with a plurality of component carriers for carrier aggregation. Furthermore, the method comprises receiving PDSCH on a first component carrier. The method also comprises transmitting a corresponding PDCCH on a second component carrier. In addition, the method comprises using a RRC signal to configure a CFI with an initial configured value. The method further comprises setting the CFI so that the CFI could be used to determine a starting point of the PDSCH.

DETAILED DESCRIPTION

The exemplary wireless communication systems and devices described below employ a wireless communication system, supporting a broadcast service. Wireless communication systems are widely deployed to provide various types of communication such as voice, data, and so on. These systems may be based on code division multiple access (CDMA), time division multiple access (TDMA), orthogonal frequency division multiple access (OFDMA), 3GPP LTE (Long Term Evolution) wireless access, 3GPP LTE-A (Long Term Evolution Advanced) wireless access, 3GPP2 UMB (Ultra Mobile Broadband), WiMax, or some other modulation techniques.

In particular, the exemplary wireless communication systems devices described below may be designed to support one or more standards such as the standard offered by a consortium named "3rd Generation Partnership Project" referred to herein as 3GPP, including 3GPP TS 36.211 V8.6.0 ("E-UTRA Physical Channels and Modulation"), 3GPP TR 36.912 V9.0.0 ("Feasibility Study for Further Advancements for E-UTRA (LTE-Advanced) (Release 9)"), and 3GPP TSG-RAN WG1 Meeting #61 ("Cross-carrier CFI Signalling")—R1-103052). The standards and documents listed above are hereby expressly incorporated herein.

Figure 1:
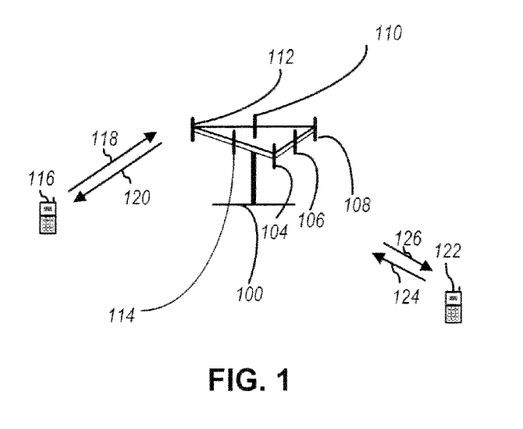
FIG. 1 shows a multiple access wireless communication system according to one embodiment of the invention.

FIG. 1 shows a multiple access wireless communication system according to one embodiment of the invention. An access network 100 (AN) includes multiple antenna groups, one including 104 and 106, another including 108 and 110, and an additional including 112 and 114. In FIG. A1, only two antennas are shown for each antenna group, however, more or fewer antennas may be utilized for each antenna group. Access terminal 116 (AT) is in communication with antennas 112 and 114, where antennas 112 and 114 transmit information to access terminal 116 over forward link 120 and receive information from access terminal 116 over reverse link 118. Access terminal (AT) 122 is in communication with antennas 106 and 108, where antennas 106 and 108 transmit information to access terminal (AT) 122 over forward link 126 and receive information from access terminal (AT) 122 over reverse link 124. In a FDD system, communication links 118, 120, 124 and 126 may use different frequency for communication. For example, forward link 120 may use a different frequency than that used by reverse link 118.

Each group of antennas and/or the area in which they are designed to communicate is often referred to as a sector of the access network. In the embodiment, antenna groups each are designed to communicate to access terminals in a sector of the areas covered by access network 100.

In communication over forward links 120 and 126, the transmitting antennas of access network 100 may utilize beamforming in order to improve the signal-to-noise ratio of forward links for the different access terminals 116 and 122. Also, an access network using beamforming to transmit to access terminals scattered randomly through its coverage normally causes less interference to access terminals in neighboring cells than an access network transmitting through a single antenna to all its access terminals.

An access network (AN) may be a fixed station or base station used for communicating with the terminals and may also be referred to as an access point, a Node B, a base station, an enhanced base station, an eNodeB, or some other terminology. An access terminal (AT) may also be called user equipment (UE), a wireless communication device, terminal, access terminal or some other terminology.

Figure 2:
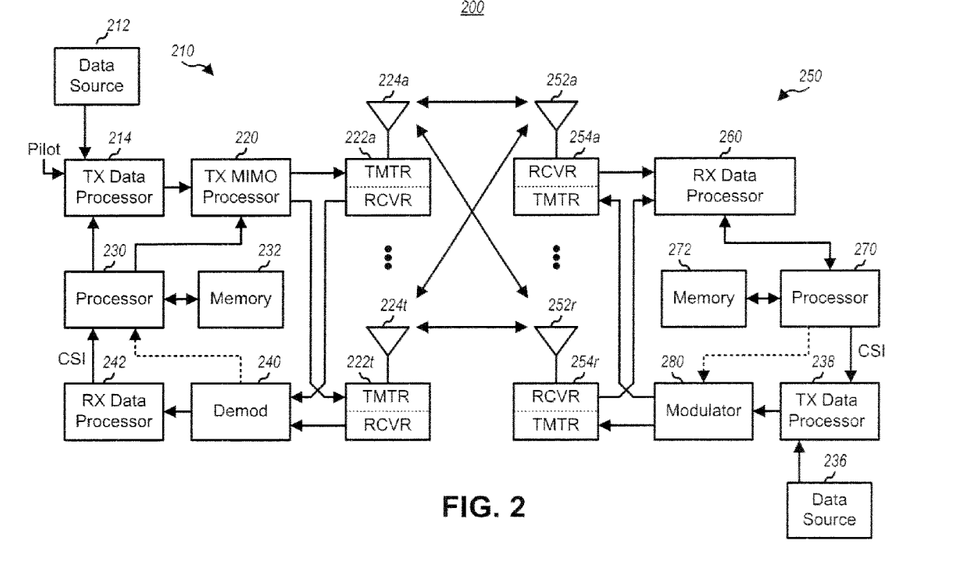
FIG. 2 is a block diagram of an embodiment of a transmitter system (also known as the access network (AN)) and a receiver system (also known as access terminal (AT) or user equipment (UE)) according to one embodiment of the invention.

FIG. 2 is a simplified block diagram of an embodiment of a transmitter system 210 (also known as the access network) and a receiver system 250 (also known as access terminal (AT) or user equipment (UE)) in a MIMO system 200. At the transmitter system 210, traffic data for a number of data streams is provided from a data source 212 to a transmit (TX) data processor 214.

In one embodiment, each data stream is transmitted over a respective transmit antenna. TX data processor 214 formats, codes, and interleaves the traffic data for each data stream based on a particular coding scheme selected for that data stream to provide coded data.

The coded data for each data stream may be multiplexed with pilot data using OFDM techniques. The pilot data is typically a known data pattern that is processed in a known manner and may be used at the receiver system to estimate the channel response. The multiplexed pilot and coded data for each data stream is then modulated (i.e., symbol mapped) based on a particular modulation scheme (e.g., BPSK, QPSK, M-PSK, or M-QAM) selected for that data stream to provide modulation symbols. The data rate, coding, and modulation for each data stream may be determined by instructions performed by processor 230.

The modulation symbols for all data streams are then provided to a TX MIMO processor 220, which may further process the modulation symbols (e.g., for OFDM). TX MIMO processor 220 then provides $N_T$ modulation symbol streams to $N_T$ transmitters (TMTR) 222a through 222t. In certain embodiments, TX MIMO processor 220 applies beamforming weights to the symbols of the data streams and to the antenna from which the symbol is being transmitted.

Each transmitter 222 receives and processes a respective symbol stream to provide one or more analog signals, and further conditions (e.g., amplifies, filters, and upconverts) the analog signals to provide a modulated signal suitable for transmission over the MIMO channel. $N_T$ modulated signals from transmitters 222a through 222t are then transmitted from $N_T$ antennas 224a through 224t, respectively.

At receiver system 250, the transmitted modulated signals are received by $N_R$ antennas 252a through 252r and the received signal from each antenna 252 is provided to a respective receiver (RCVR) 254a through 254r. Each receiver 254 conditions (e.g., filters, amplifies, and downconverts) a respective received signal, digitizes the conditioned signal to provide samples, and further processes the samples to provide a corresponding "received" symbol stream.

An RX data processor 260 then receives and processes the $N_R$ received symbol streams from $N_R$ receivers 254 based on a particular receiver processing technique to provide $N_T$ "detected" symbol streams. The RX data processor 260 then demodulates, deinterleaves, and decodes each detected symbol stream to recover the traffic data for the data stream. The processing by RX data processor 260 is complementary to that performed by TX MIMO processor 220 and TX data processor 214 at transmitter system 210.

A processor 270 periodically determines which pre-coding matrix to use (discussed below). Processor 270 formulates a reverse link message comprising a matrix index portion and a rank value portion.

The reverse link message may comprise various types of information regarding the communication link and/or the received data stream. The reverse link message is then processed by a TX data processor 238, which also receives traffic data for a number of data streams from a data source 236, modulated by a modulator 280, conditioned by transmitters 254a through 254r, and transmitted back to transmitter system 210.

At transmitter system 210, the modulated signals from receiver system 250 are received by antennas 224, conditioned by receivers 222, demodulated by a demodulator 240, and processed by a RX data processor 242 to extract the reserve link message transmitted by the receiver system 250. Processor 230 then determines which pre-coding matrix to use for determining the beamforming weights then processes the extracted message.

Memory 232 may be used to temporarily store some buffered/computational data from 240 or 242 through Processor 230, store some buffed data from 212, or store some specific program codes. And Memory 272 may be used to temporarily store some buffered/computational data from 260 through Processor 270, store some buffed data from 236, or store some specific program codes.

Figure 3:
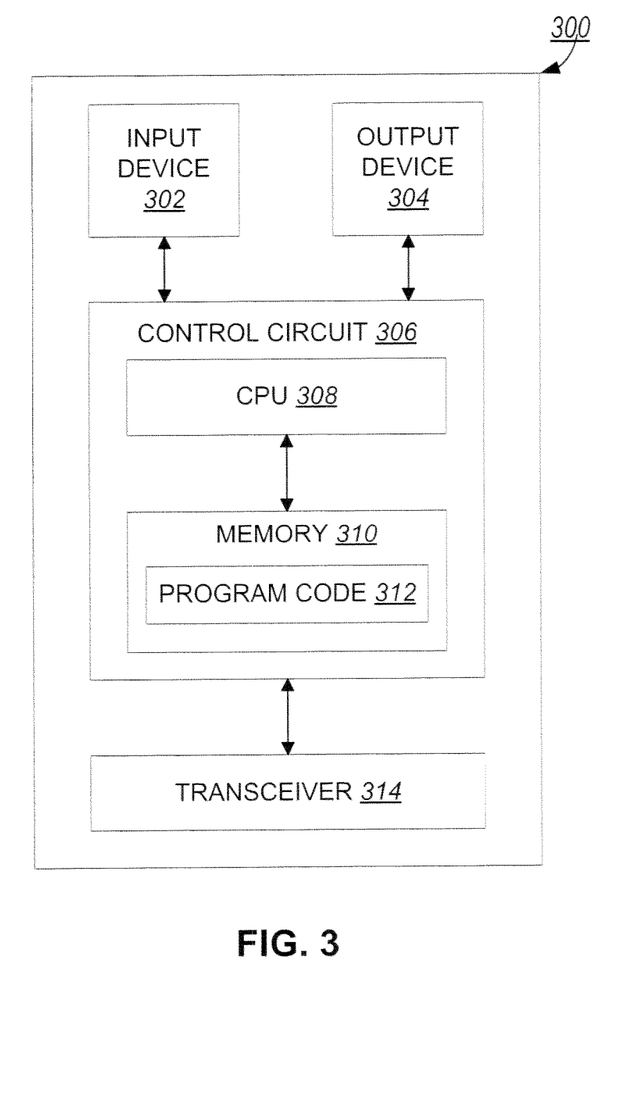
FIG. 3 shows an alternative functional block diagram of a communication device according to one embodiment of the invention.

Turning to FIG. 3, this figure shows an alternative simplified functional block diagram of a communication device according to one embodiment of the invention. As shown in FIG. 3, the communication device 300 in a wireless communication system can be utilized for realizing the UEs (or ATs) 116 and 122 in FIG. 1, and the wireless communications system is preferably the LTE system. The communication device 300 may include an input device 302, an output device 304, a control circuit 306, a central processing unit (CPU) 308, a memory 310, a program code 312, and a transceiver 314. The control circuit 306 executes the program code 312 in the memory 310 through the CPU 308, thereby controlling an operation of the communications device 300. The communications device 300 can receive signals input by a user through the input device 302, such as a keyboard or keypad, and can output images and sounds through the output device 304, such as a monitor or speakers. The transceiver 314 is used to receive and transmit wireless signals, delivering received signals to the control circuit 306, and outputting signals generated by the control circuit 306 wirelessly.

Figure 4:
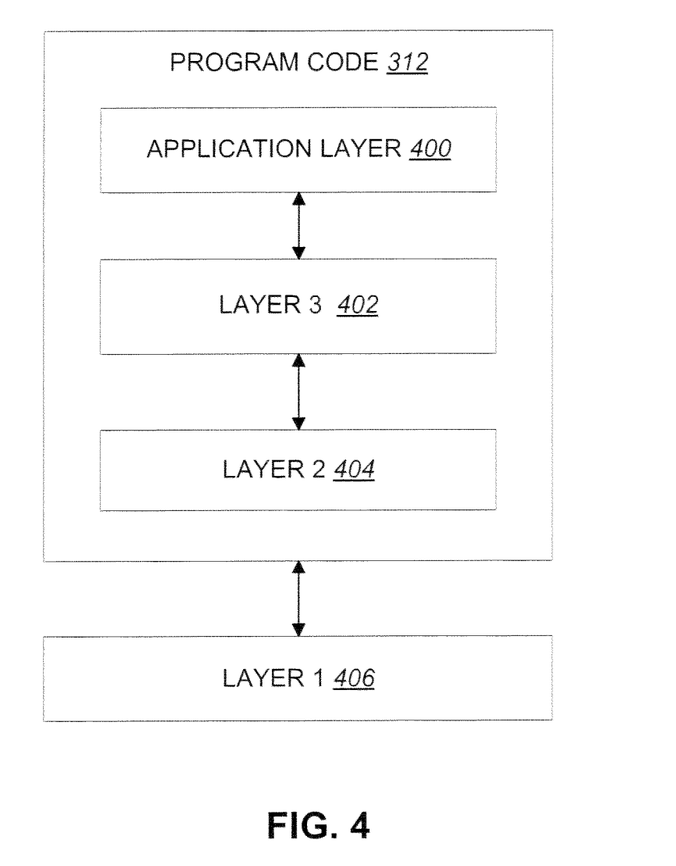
FIG. 4 is a simplified block diagram of the program code shown in FIG. 3 according to one embodiment of the invention.

FIG. 4 is a simplified block diagram of the program code 312 shown in FIG. 3 in accordance with one embodiment of the invention. In this embodiment, the program code 312 includes an application layer 400, a Layer 3 portion 402, and a Layer 2 portion 404, and is coupled to a Layer 1 portion 406. The Layer 3 portion 402 generally performs radio resource control. The Layer 2 portion 404 generally performs link control. The Layer 1 portion 406 generally performs physical connections.

For LTE or LTE-A system, the Layer 2 portion 404 may include a Radio Link Control (RLC) layer and a Medium Access Control (MAC) layer. The Layer 3 portion 402 may include a Radio Resource Control (RRC) layer.

Figure 5:
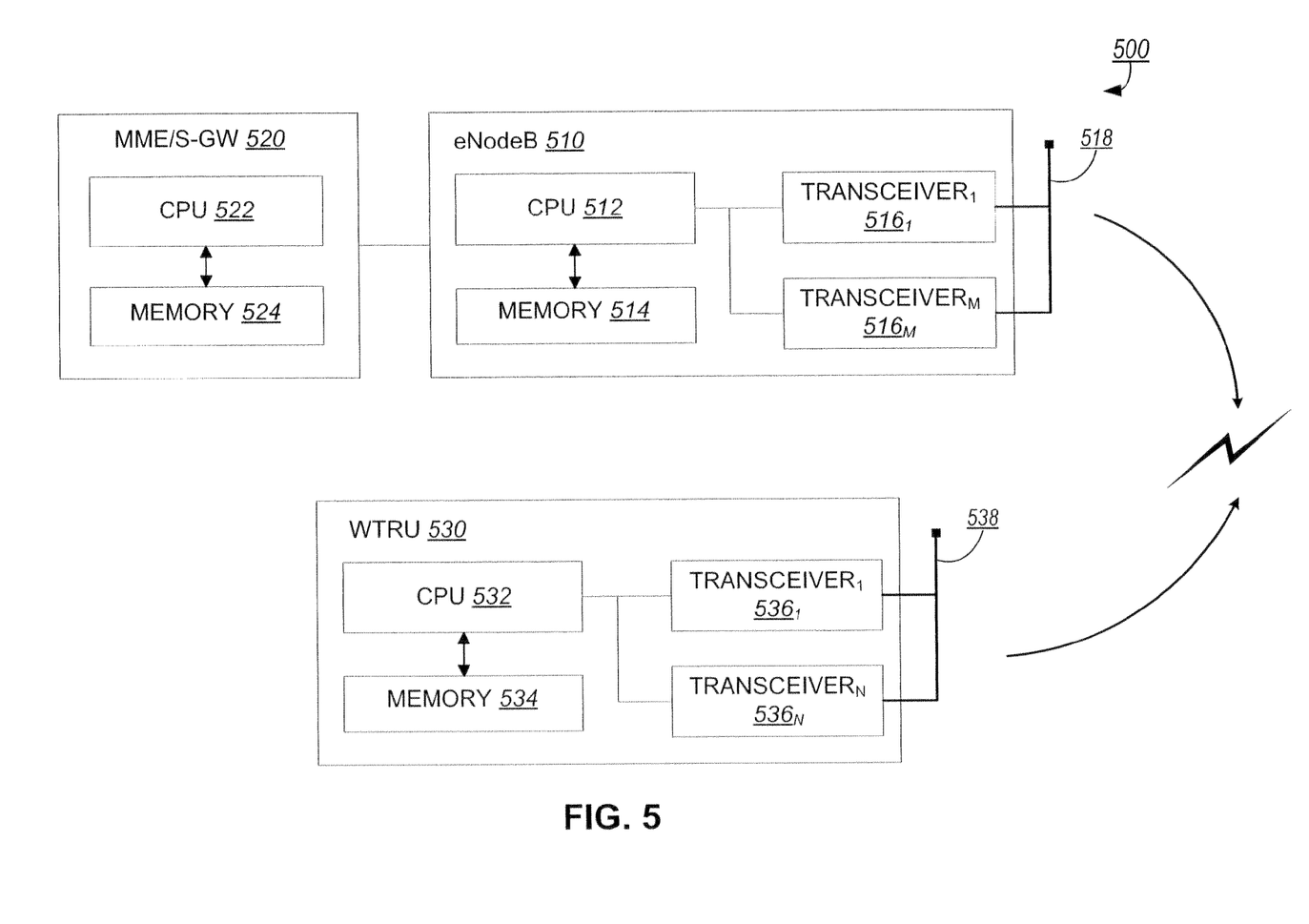
FIG. 5 is a simplified block diagram of a wireless communication system from an alternative perspective according to one embodiment of the invention.

FIG. 5 is a simplified block diagram of a wireless communication system from an alternative perspective. As shown, the system 500 includes the WTRU (wireless transmit/receive unit) 530, the eNB 510, and the MME/S-GW (Mobility Management Entity/Serving GateWay) 520. The WTRU 530, the eNB 510 and the MME/S-GW 520 are configured to perform SRS transmission with MIMO and carrier aggregation techniques.

In addition to the components that may be found in a typical WTRU, the WTRU 530 includes a processor or CPU 532 with an optional memory 534, one or more one transceivers 536₁, ..., 536_N, and an antenna 538. The CPU 532 is configured to perform a method of SRS transmission with MIMO and carrier aggregation techniques. The transceivers 536₁, ..., 536_N are in communication with the CPU or processor 532 and the antenna 538 to facilitate the transmission and reception of wireless communications.

In addition to the components that may be found in a typical eNB, the eNB 510 includes a processor or CPU 512 with an optional memory 514, one or more transceivers 516₁ ... 516_M, and an antenna 518. The CPU 512 is configured to support SRS functionality with (MIMO) and carrier aggregation techniques. The transceivers 516₁, ..., 516_M are in communication with the CPU 512 and an antennas 518 to facilitate the transmission and reception of wireless communications. The CPU is generally configured to: i) determine which WTRUs will be transmitting SRS, ii) determine each WTRU's allocation in frequency and time for SRS transmission, as well as the type of SRS transmission and communicate this information to the WTRUs, iii) receive the SRS measurement information and iv) process the SRS information and inform the scheduler so that the scheduler can make scheduling decisions. The eNB 520 is connected to the MME/S-GW 520 which includes a processor 522 with an optional memory 524.

In the following discussion, the invention will be described mainly in the context of the 3GPP architecture reference model. However, it is understood that with the disclosed information, one skilled in the art could easily adapt for use and implement aspects of invention in a 3GPP2 network architecture as well as in other network architectures.

In LIE, there is a single transmission of a physical downlink control channel (PUCCH), Physical Uplink Shared Channel (PUSCH), or Sounding Reference Signals (SRSs) with a single antenna and a single carrier. The WTRU does not transmit SRS whenever SRS and PUCCH format 2/2a/2b transmission happen to coincide in the same subframe. The WTRU does not transmit SRS whenever SRS and acknowledge/negative acknowledge (ACK/NACK) and/or positive SRS transmissions happen to coincide in the same subframe unless the parameter Simultaneous-AN-and-SRS is true. The parameter Simultaneous-AN-and-SRS provided by a higher layer determines if a WTRU is configured to support the transmission of ACK/NACK on PUCCH and SRS in one subframe. If it is configured to support the transmission of ACK/NACK on PUCCH and SRS in one subframe, then in the cell specific SRS subframes WTRU shall transmit ACK/NACK and SR using the shortened PUCCH format, where the ACK/NACK or the SR symbol corresponding to the SRS symbol is punctured. Furthermore, in order for the eNodeB to perform reliable channel estimation for frequency-scheduling for each UL, the transmit power for SRS (and other channels) is controlled.

Additionally, in LIE, Single Carrier Frequency Division Multiple Access (SC-FDMA) transmission was selected for uplink (UL) direction. The specific implementation is based on Discrete Fourier Transform Spread Orthogonal Frequency Division Multiplexing (DFT-S-OFDM). For the purpose of this application, either term may be used interchangeably. A WTRU in the UL will transmit only on a limited, contiguous set of assigned sub-carriers in an FDMA arrangement. For illustration purposes, if the overall OFDM signal or system bandwidth in the UL is composed of useful sub-carriers numbered 1 to 100, a first given WTRU would be assigned to transmit its own signal on sub-carriers 1-12, a second given WTRU would transmit on sub-carriers 13-24, and so on. An eNodeB (or eNB) would receive the composite UL signal across the entire transmission bandwidth from one or more WTRUs at the same time, but each WTRU would only transmit into a subset of the available transmission bandwidth. DFT-S OFDM in the LIE UL was selected by 3GPP Radio Layer 1 (RAN1) as a form of OFDM transmission with the additional constraint that the time-frequency resource assigned to a WTRU must consist of a set of frequency-consecutive sub-carriers. In the LIE UL, there is no DC sub-carrier (unlike the downlink (DL)). Frequency hopping may be applied in one mode of operation to UL transmissions by a WTRU.

WTRUs transmit their UL data (and in some cases their control information) on the physical uplink shared channel (PUSCH). The transmission of the PUSCH is scheduled and controlled by the eNodeB using the so-called uplink scheduling grant, which is carried on physical downlink control channel (PDCCH) format 0. As part of the uplink scheduling grant, the WTRU receives control information on the modulation and coding set (MCS), transmit power control (TPC) command, uplink resources allocation (i.e., the indices of allocated resource blocks), etc. Then, the WTRU will transmit its PUSCH on allocated uplink resources with corresponding MCS at transmit power controlled by the TPC command.

Similar to LIE DL, reference signals for channel estimation are also needed for the LTE UL to enable coherent demodulation of PUSCH (or PUCCH) at the eNodeB. These reference signals are referred to as UL demodulation reference signals (DRS). They are always transmitted together with and covering the same frequency band as PUSCH (or PUCCH).

To allow for the eNodeB to estimate UL channel quality for UL scheduling, sounding reference signals (SRS) may be transmitted in UL. In the frequency domain. SRS transmissions may cover the frequency band that is of interest for the frequency domain scheduling. When an SRS is to be transmitted in a subframe, it occupies the last SC-FDMA symbol of the subframe. If a WTRU is transmitting SRS in a certain subframe, then the last symbol of the subframe is then not used for PUSCH transmission by any WTRU within the cell. In order for the eNodeB to perform reliable channel estimation for frequency-scheduling for each UL, the transmit power for SRS (and other channels) is controlled.

In addition, from a UE perspective, there is one transport block (in absence of spatial multiplexing) and one hybrid-ARQ (Hybrid Automatic Repeat Request) entity per scheduled component carrier. Each transport block is mapped to a single component carrier. A UE may be scheduled over multiple component carriers simultaneously. The design principles for downlink control signaling of control region size and uplink and downlink resource assignments can generally be described as following: (1) PDCCH (Physical Downlink Control Channel) on a component carrier assigns PDSCH (Physical Downlink Shared Channel) resources on the same component carrier and PUSCH resources on a single linked UL component carrier, (2) PDCCH on a component carrier can assign PDSCH or PUSCH resources for one of multiple component carriers.

In LTE, PDCCH and PDSCH are multiplexed in the time domain. In general, PDCCH occupies first several OFDM symbols whose number. CFI value, is determined by the signalling on PCFICH (Physical Control Format Indicator Channel). In one embodiment, exemplary possible values are provided the table below:

| Subframe | Number of OFDM symbols for PDCCH when $N_{RB}^{DL} > 10$ | Number of OFDM symbols for PDCCH when $N_{RB}^{DL} \leq 10$ |
|---|---|---|
| Subframe 1 and 6 for frame structure type 2 | 1, 2 | 2 |
| MBSFN (Multi-Media Broadcast over a Single Frequency Network) subframes on a carrier supporting both PMCH and PDSCH for 1 or 2 cell-specific antenna ports | 1, 2 | 7 |
| MBSFN subframes on a carrier supporting both PMCH and PDSCH for 4 cell-specific antenna ports | 2 | 2 |
| MBSFN subframes on a carrier not supporting PDSCH | 0 | 0 |
| Non-MBSFN subframes (except subframe 6 for frame structure type 2) configured with positioning reference signals | 1, 2, 3 | 2, 3 |
| All other cases | 1, 2, 3 | 2, 3, 4 |

In LTE-A, cross carrier scheduling is adopted for carrier aggregation. With such feature. PDSCH for one carrier can be scheduled from PDCCH on the other carrier if PDCCH on its own CC is not reliable due to interference (e.g., Het-Net). There were discussions that under such scenario. PCFICH may be unreliable as well which results in wrong starting position and PDSCH decoding problem. RRC signalling or PDCCH signalling were proposed to carry such information.

Some concerns were raised for MBSFN subframe regarding this issue. Since maximum number of OFDM symbols in MBSFN subframe is two, it was proposed to have extra information in RRC configuration to let UE know which CFI value should be applied for every subframe, considering MBMS (Multimedia Broadcast/Multicast Service) subframe configurations among eNBs.

Signalling CFI for every subframe would require extra overhead. Furthermore, reconfiguration would be needed more often when the configuration of the MBSFN subframe changes. In addition, more interaction or coordination among eNBs would be required to maintain CFI information for each other.

Figure 6:
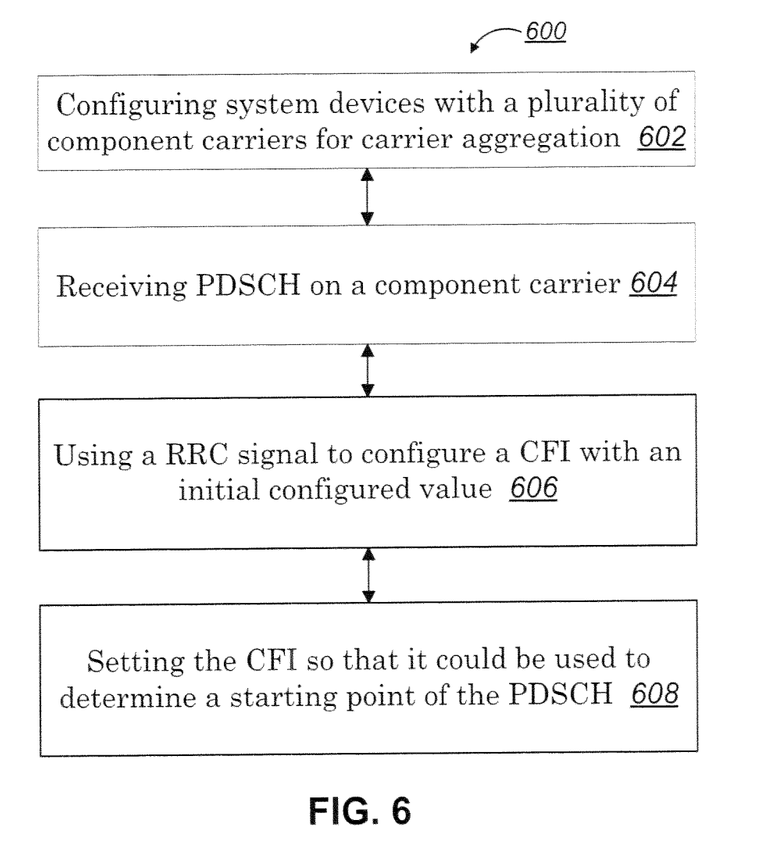
FIG. 6 outlines an exemplary flow diagram to determine a CFI value according to one embodiment of the invention.

Turning now to FIG. 6, this figure outlines an exemplary flow diagram to determine a CFI value to reduce resource waste due to cross carrier scheduling, and to simplify the mechanism to determine CFI for cross carrier scheduling according to one embodiment of the invention.

A method and apparatus are disclosed determine a CFI value in a wireless communication system. In one embodiment, the method comprises configuring system devices, such as a UE or an eNB, with a plurality of component carriers for carrier aggregation. Furthermore, the method comprises receiving PDSCH on a first component carrier. The method also comprises transmitting a corresponding PDCCH on a second component carrier. In addition, the method also comprises using a RRC signal to configure a CFI with an initial configured value. The method further comprises setting the CFI so that the CFI could be used to determine a starting point of the PDSCH.

In step 602, devices in the system, such as a UE or an eNB, are configured with a plurality of component carriers for carrier aggregation. In step 604, a PDSCH is received on one component carrier. In step 606, a corresponding PDCCH is transmitted on a different component carrier. In step 608, a RRC signal is used to configure a CFI with an initial configured value (such as the value A). In step 610, the CFI is set so that it could be used to determine a starting point of the PDSCH.

In one embodiment, for a MBSFN subframe, the CFI would be set to be the lesser of the initial configured value and a selected constant. For example, if the CFI is initially configured, using the RRC signal, to be the value A and the selected constant has a value of two (2), the CFI will be set to min (A, 2) or the lesser the value A and two (2) for a MBSFN subframe. In an alternative embodiment, for a normal subframe, the CFI would be set to the initial configured value. For example, if the CFI is initially configured, using the RRC signal, to be the value A, the CFI would be set to the value A for a normal subframe.

In another embodiment, the MBSFN subframes are determined from a MBSFN subframe configuration of the second component carrier used to transmit the PDSCH. In this embodiment, the MBSFN subframe configuration is carried on SIB (System Information Block) 2 of the component carrier used to transmit PDSCH.

Various aspects of the disclosure have been described above. It should be apparent that the teachings herein may be embodied in a wide variety of forms and that any specific structure, function, or both being disclosed herein is merely representative. Based on the teachings herein one skilled in the art should appreciate that an aspect disclosed herein may be implemented independently of any other aspects and that two or more of these aspects may be combined in various ways. For example, an apparatus may be implemented or a method may be practiced using any number of the aspects set forth herein. In addition, such an apparatus may be implemented or such a method may be practiced using other structure, functionality, or structure and functionality in addition to or other than one or more of the aspects set forth herein. As an example of some of the above concepts, in some aspects concurrent channels may be established based on pulse repetition frequencies. In some aspects concurrent channels may be established based on pulse position or offsets. In some aspects concurrent channels may be established based on time hopping sequences. In some aspects concurrent channels may be established based on pulse repetition frequencies, pulse positions or offsets, and time hopping sequences.

Those of skill in the art would understand that information and signals may be represented using any of a variety of different technologies and techniques. For example, data, instructions, commands, information, signals, bits, symbols, and chips that may be referenced throughout the above description may be represented by voltages, currents, electromagnetic waves, magnetic fields or particles, optical fields or particles, or any combination thereof.

Those of skill would further appreciate that the various illustrative logical blocks, modules, processors, means, circuits, and algorithm steps described in connection with the aspects disclosed herein may be implemented as electronic hardware (e.g. a digital implementation, an analog implementation, or a combination of the two, which may be designed using source coding or some other technique), various forms of program or design code incorporating instructions (which may be referred to herein, for convenience, as "software" or a "software module"), or combinations of both.

To clearly illustrate this interchangeability of hardware and software, various illustrative components, blocks, modules, circuits, and steps have been described above generally in terms of their functionality. Whether such functionality is implemented as hardware or software depends upon the particular application and design constraints imposed on the overall system. Skilled artisans may implement the described functionality in varying ways for each particular application, but such implementation decisions should not be interpreted as causing a departure from the scope of the present disclosure.

In addition, the various illustrative logical blocks, modules, and circuits described in connection with the aspects disclosed herein may be implemented within or performed by an integrated circuit ("IC"), an access terminal, or an access point. The IC may comprise a general purpose processor, a digital signal processor (DSP), an application specific integrated circuit (ASIC), a field programmable gate array (FPGA) or other programmable logic device, discrete gate or transistor logic, discrete hardware components, electrical components, optical components, mechanical components, or any combination thereof designed to perform the functions described herein, and may execute codes or instructions that reside within the IC, outside of the IC, or both. A general purpose processor may be a microprocessor, but in the alternative, the processor may be any conventional processor, controller, microcontroller, or state machine. A processor may also be implemented as a combination of computing devices. e.g. a combination of a DSP and a microprocessor, a plurality of microprocessors, one or more microprocessors in conjunction with a DSP core, or any other such configuration.

It is understood that any specific order or hierarchy of steps in any disclosed process is an example of a sample approach. Based upon design preferences, it is understood that the specific order or hierarchy of steps in the processes may be rearranged while remaining within the scope of the present disclosure. The accompanying method claims present elements of the various steps in a sample order, and are not meant to be limited to the specific order or hierarchy presented.

The steps of a method or algorithm described in connection with the aspects disclosed herein may be embodied directly in hardware, in a software module executed by a processor, or in a combination of the two. A software module (e.g., including executable instructions and related data) and other data may reside in a data memory such as RAM memory, flash memory, ROM memory, EPROM memory, EEPROM memory, registers, a hard disk, a removable disk, a CD-ROM, or any other form of computer-readable storage medium known in the art. A sample storage medium may be coupled to a machine such as, for example, a computer/processor (which may be referred to herein, for convenience, as a "processor") such the processor can read information (e.g., code) from and write information to the storage medium. A sample storage medium may be integral to the processor. The processor and the storage medium may reside in an ASIC. The ASIC may reside in user equipment. In the alternative, the processor and the storage medium may reside as discrete components in user equipment. Moreover, in some aspects any suitable computer-program product may comprise a computer-readable medium comprising codes relating to one or more of the aspects of the disclosure. In some aspects a computer program product may comprise packaging materials.

While the invention has been described in connection with various aspects, it will be understood that the invention is capable of further modifications. This application is intended to cover any variations, uses or adaptation of the invention following, in general, the principles of the invention, and including such departures from the present disclosure as come within the known and customary practice within the art to which the invention pertains.

What is claimed is:

1. A method to determine an indicator value in a wireless communication system, comprising:
   configuring system devices with a first component carrier and a second component carrier for carrier aggregation;
   receiving PDSCH (Physical Downlink Shared Channel) on the first component carrier;
   receiving a corresponding PDCCH (Physical Downlink Control Channel) on the second component carrier;
   configuring a CFI (Control Format Indicator) with an initial configured value via a RRC (Radio Resource Control) signal; and
   setting the CFI, which is used to determine a starting point of the PDSCH, to be the lesser of the initial configured value and a selected constant for a MBSFN (Multi-Media Broadcast over a Single Frequency Network) subframe, wherein the CFI, for a normal subframe, is set to the initial configured value.

2. The method of claim 1, wherein the selected constant is two (2).

3. The method of claim 1, wherein MBSFN subframes are determined from a MBSFN subframe configuration of the second component carrier used to transmit the PDSCH.

4. The method of claim 3, wherein the MBSFN subframe configuration is carried on SIB (System Information Block) 2 of the second component carrier used to transmit PDSCH.

5. A method to determine an indicator value in a wireless communication system, comprising:
   configuring system devices with a first component carrier and a second component carrier for carrier aggregation;
   receiving PDSCH (Physical Downlink Shared Channel) on a first component carrier;
   receiving a corresponding PDCCH (Physical Downlink Control Channel) on a second component carrier;
   configuring a CFI (Control Format Indicator), which is used to determine a starting point of the PDSCH, with an initial configured value via a RRC (Radio Resource Control) signal; and
   setting the CFI, for a MBSFN (Multi-Media Broadcast over a Single Frequency Network) subframe, to be the lesser of the initial configured value and a selected constant, wherein the CFI, for a normal subframe, is set to the initial configured value.

6. The method of claim 5, wherein the selected constant is two (2).

7. The method of claim 5, wherein MBSFN subframes are determined from a MBSFN subframe configuration of the second component carrier used to transmit the PDSCH.

8. The method of claim 7, wherein the MBSFN subframe configuration is carried on SIB 2 (System Information Block) of the second component carrier used to transmit PDSCH.

9. An apparatus to determine an indicator value in a wireless communication system, comprising:
   a first module to configure system devices with a first component carrier and a second component carrier for carrier aggregation;
   a second module to receive PDSCH (Physical Downlink Shared Channel) on a first component carrier;
   a third module to receive a corresponding PDCCH (Physical Downlink Control Channel) on a second component carrier;
   a fourth module to configure a CFI (Radio Resource Control) with an initial configured value via a RRC (Radio Resource Control) signal; and a fifth module to set the CFI, which is used to determine a starting point of the PDSCH, to be the lesser of the initial configured value and a selected constant for a MBSFN (Multi-Media Broadcast over a Single Frequency Network) subframe, wherein the CFI, for a normal subframe, is set to the initial configured value.

10. The apparatus of claim 9, wherein the CFI is set to the selected constant of two (2).

11. The apparatus of claim 9, wherein MBSFN subframes are determined from a MBSFN subframe configuration of the second component carrier used to transmit the PDSCH.

12. The apparatus of claim 11, wherein the MBSFN subframe configuration is carried on SIB (System Information Block) 2 of the second component carrier used to transmit PDSCH.

* * * * *